United States Patent
Chang (10) Patent No.: US 11,514,884 B2
(45) Date of Patent: Nov. 29, 2022

(54) DRIVING SOUND LIBRARY, APPARATUS FOR GENERATING DRIVING SOUND LIBRARY AND VEHICLE COMPRISING DRIVING SOUND LIBRARY

(71) Applicants: Hyundai Motor Company, Seoul (KR); Kia Motors Corporation, Seoul (KR)

(72) Inventor: Kyoung-Jin Chang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 95 days.

(21) Appl. No.: 17/091,312

(22) Filed: Nov. 6, 2020

(65) Prior Publication Data

US 2021/0407492 A1  Dec. 30, 2021

(30) Foreign Application Priority Data

Jun. 26, 2020 (KR) .................. 10-2020-0078536

(51) Int. Cl.
*G10K 15/02* (2006.01)
*G10L 25/51* (2013.01)
(Continued)

(52) U.S. Cl.
CPC ......... *G10K 15/02* (2013.01); *G01C 21/3629* (2013.01); *G10L 25/51* (2013.01);
(Continued)

(58) Field of Classification Search
CPC .. G10K 15/002; G01C 21/3629; G10L 25/51; H04R 1/025; H04R 2499/13; G10H 2210/066
See application file for complete search history.

(56) References Cited

U.S. PATENT DOCUMENTS

2008/0192954 A1* 8/2008 Honji .................. G10K 15/04
                                                381/86
2014/0016792 A1* 1/2014 Christoph ............. G10L 19/06
                                                381/61
(Continued)

FOREIGN PATENT DOCUMENTS

CN  110364140 A   10/2019
CN  105893460 B   11/2019
(Continued)

OTHER PUBLICATIONS

Donahue, C., McAuley, J. and Puckette, M., "Adversarial Audio Synthesis", Feb. 9, 2019, arxiv.org, v3 for International Conference on Learning Representations (ICLR) 2019, pp. 1-16. (Year: 2019).*

*Primary Examiner* — Daniel R Sellers
(74) *Attorney, Agent, or Firm* — Fox Rothschild LLP (57) ABSTRACT

A driving sound library provides driving sounds classified in various themes to a user by analyzing frequency characteristics and temporal characteristics of sound sources classified into categories and determining a chord corresponding to each sound source based on the frequency characteristics and the time characteristics. Modulated sound sources in which each sound source is modulated are generated by applying a chord corresponding to each sound source. The driving sound sources are generated using the sound sources and the modulated sound sources as input data. Pitches of the driving sound sources are then changed based on the driving sound sources and engine sound orders corresponding to an engine RPM of a preset range. Scores for each theme for the driving sounds are generated.

15 Claims, 7 Drawing Sheets

(51) Int. Cl.
  *G01C 21/36* (2006.01)
  *H04R 1/02* (2006.01)
(52) U.S. Cl.
  CPC ....... *H04R 1/025* (2013.01); *G10H 2210/066* (2013.01); *H04R 2499/13* (2013.01)

(56) References Cited

U.S. PATENT DOCUMENTS

2019/0111839 A1\* 4/2019 Lee ................. B60W 50/08
2019/0304418 A1  10/2019 Silverstein
2020/0135168 A1\* 4/2020 Maeda ................. G10K 15/02

FOREIGN PATENT DOCUMENTS

| KR | 10-1886534 B1 | 8/2018 |
| KR | 10-1982345 B1 | 5/2019 |
| KR | 10-2019-0100543 A | 8/2019 |
| KR | 10-2019-0137727 A | 12/2019 |

\* cited by examiner

| Nature | Cricket | Cuckoo | Oriole | Sojuk bird | Water | Frog | Mountain bird |
|---|---|---|---|---|---|---|---|

| ASMR | Bubbling water | Cup water | Drill | Alpha | Beta | Brain ASMR | Brain delta | Meditation | White noise | Wave play |
|---|---|---|---|---|---|---|---|---|---|---|

| Musical Instruments | Bass | Bell | Cello | Cello music | Organ | Flute |
|---|---|---|---|---|---|---|

| Effect | Cyber effect | No_ name | Shimmer effect | Space effect | Synth effect | Retro synth | Sine | Wind effect |
|---|---|---|---|---|---|---|---|---|

DRIVING SOUND LIBRARY, APPARATUS FOR GENERATING DRIVING SOUND LIBRARY AND VEHICLE COMPRISING DRIVING SOUND LIBRARY

CROSS-REFERENCE TO RELATED APPLICATION(S)

The present application claims priority to Korean Patent Application No 10-2020-0078536, filed on Jun. 26, 2020, the entire contents of which is incorporated herein for all purposes by this reference.

BACKGROUND

Field of the Disclosure

The present disclosure relates to a driving sound library, apparatus for generating driving sound library and vehicle comprising driving sound library for storing driving sounds of various themes.

Description of Related Art

Vehicles are typically used as transportation, and the number of vehicles is increasing. In the past, vehicles were not used beyond merely as transportation, but recently, vehicles are being used beyond just as transportation. Accordingly, many people enjoy speed like motorbikes and racing vehicles, and those who enjoy such the feeling of the speed including the operating sound and vibration sound generated by the engine of the vehicle. Accordingly, some drivers modifying the engine to obtain a desired driving sound.

In particular, for an electric vehicle, since the operating sound and vibration sound generated by the vehicle engine are absent, the driving sound artificially generated through the speaker is also output. However, since the driving sound provided to the vehicle is a driving sound previously designed by the manufacturer, it is difficult to satisfy the driver's demand for an engine sound.

SUMMARY

A driving sound library, apparatus for generating driving sound library and vehicle comprising driving sound library that stores driving sounds classified into various themes are provided.

In accordance with an aspect of the present disclosure, a driving sound library generated by a method may include analyzing frequency characteristics and temporal characteristics of each of a plurality of sound sources classified into a plurality of categories; determining a chord corresponding to each of the plurality of sound sources based on the frequency characteristics and the time characteristics; generating a plurality of modulated sound sources in which each of the plurality of sound sources is modulated by applying a chord corresponding to each of the plurality of sound sources; generating a plurality of driving sound sources using the plurality of sound sources and the plurality of modulated sound sources as input data; changing pitches of the plurality of driving sound sources based on the plurality of driving sound sources and a plurality of engine sound orders corresponding to an engine revolutions per minute (RPM) of a preset range, and generating a plurality of driving sounds; receiving scores for each theme for the plurality of driving sounds; and storing the plurality of driving sounds and themes of each of the plurality of driving sounds in association with each other.

Analyzing frequency characteristics and temporal characteristics of each of a plurality of sound sources classified into a plurality of categories may include classifying each of the plurality of sound sources according to frequency bands; and classifying each of the plurality of sound sources into a first sound source having a continuous sound and a second sound source having a discontinuous sound. Generating a plurality of modulated sound sources in which each of the plurality of sound sources is modulated by applying a chord corresponding to each of the plurality of sound sources may include applying the same chord to sound sources classified in the same frequency band within the first sound source or the second sound source.

The generating of a plurality of driving sound sources using the plurality of sound sources and the plurality of modulated sound sources as input data may include using sound sources obtained by dividing the plurality of sound sources for each time section as input data of WaveGan. The changing of pitches of the plurality of driving sound sources based on the plurality of driving sound sources and a plurality of engine sound orders corresponding to an engine RPM of a preset range, and generating a plurality of driving sounds may include changing the pitches of the plurality of driving sound sources such that a difference value between the frequencies of the plurality of driving sound sources and the frequencies of the plurality of engine sound orders is equal to or less than a preset value.

Additionally the receiving of scores for each theme for the plurality of driving sounds may include receiving a score of a first theme and a score of a second theme for each of the plurality of driving sounds, and storing the plurality of driving sounds and themes of each of the plurality of driving sounds in association with each other may include storing by classifying the driving sound having the highest score of the first theme among the plurality of driving sounds as a first theme, and classifying the driving sound having the highest score of the second theme as a second theme.

In accordance with an aspect of the present disclosure, an apparatus for generating driving sound source library may include a database configured to store a plurality of sound sources classified as plurality of categories; and at least one processor configured to: analyze frequency characteristics and temporal characteristics of each of a plurality of sound sources, determine a chord corresponding to each of the plurality of sound sources based on the frequency characteristics and the time characteristics, generate a plurality of modulated sound sources in which each of the plurality of sound sources is modulated by applying a chord corresponding to each of the plurality of sound sources, and generate a plurality of driving sound sources by using the plurality of sound sources and the plurality of modulated sound sources as input data, and change pitches of the plurality of driving sound sources based on the plurality of driving sound sources and a plurality of engine sound orders corresponding to an engine RPM of a preset range, and generate a plurality of driving sounds; an input configured to receive scores for each theme for the plurality of driving sounds; and a driving sound library. The at least one processor may be configured to store the plurality of driving sounds and themes of each of the plurality of driving sounds in association with each other.

Additionally, the at least one processors may be configured to classify each of the plurality of sound sources according to frequency bands; and classify each of the plurality of sound sources into a first sound source having a continuous sound and a second sound source having a discontinuous sound. The at least one processor may be configured to apply the same chord to sound sources classified in the same frequency band within the first sound source or the second sound source.

Further, the at least one processor may be configured to use sound sources obtained by dividing the plurality of sound sources for each time section as input data of Wave-Gan. The at least one processor may be configured to change the pitches of the plurality of driving sound sources such that a difference value between the frequencies of the plurality of driving sound sources and the frequencies of the plurality of engine sound orders is equal to or less than a preset value.

The input may be configured to receive scores for each theme for the plurality of driving sounds. In particular, the input may be configured to receive a score of a first theme and a score of a second theme for each of the plurality of driving sounds, and the at least one processors may be configured to store the scores by classifying the driving sound having the highest score of the first theme among the plurality of driving sounds as a first theme, and classifying the driving sound having the highest score of the second theme as a second theme.

In accordance with an aspect of the present disclosure, a vehicle may include a driving sound library, a speaker, and a controller configured to select any one theme from among a plurality of themes of driving sounds stored in the driving sound library based on the destination of the vehicle input in the navigation system or the road information on which the vehicle is driving, and operate the speaker to output a plurality of stored driving sounds in association with the selected theme.

The controller may be configured to select at least one driving sound among plurality of driving sounds stored in association with the selected theme based on at least one of an output torque, a speed, an acceleration pedal pressure of the vehicle. The controller may also be configured to determine volume of at least a plurality of driving sounds stored in association with the selected theme based on at least one of the output torque, speed, and accelerator pedal pressure of the vehicle.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present disclosure belongs. This specification does not describe all elements of the exemplary embodiments of the present disclosure and detailed descriptions on what are well known in the art or redundant descriptions on substantially the same configurations may be omitted.

Throughout the specification, when an element is referred to as being "connected to" another element, it may be directly or indirectly connected to the other element and the "indirectly connected to" includes being connected to the other element via a wireless communication network. The term 'part, module, member, block' used in the specification may be implemented in software or hardware, and a plurality of 'part, module, member, block' may be embodied as one component, It is also possible that one 'part, module, member, block' includes a plurality of components. Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated. Singular expressions include plural expressions unless the context clearly indicates an exception. In addition, terms such as "~ unit", "~ group", "~ block", "~ member", and "~ module" may mean a unit that processes at least one function or operation. For example, the terms may refer to at least one hardware such as Field-Programmable Gate Array (FPGA)/Application Specific Integrated Circuit (ASIC), at least one software stored in a memory, or at least one process processed by a processor.

The symbols attached to each step are used to identify each step, and these symbols do not indicate the order of each step, and each step is executed differently from the specified order unless a specific order is clearly stated in the context. Hereinafter, with reference to the accompanying drawings will be described the working principle and exemplary embodiments of the present disclosure.

Figure 1:
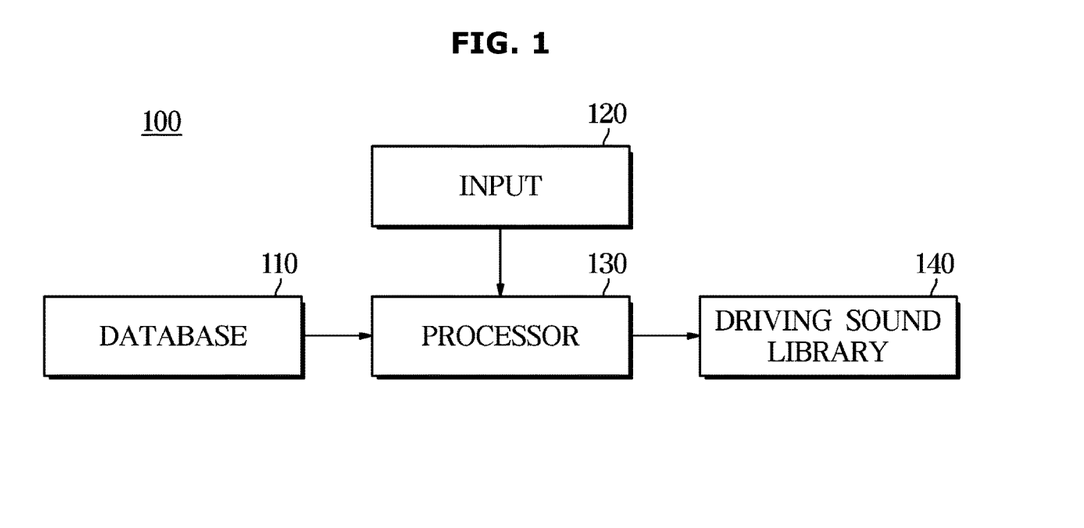
FIG. 1 is a control block diagram of an apparatus for generating a driving sound library according to an exemplary embodiment.

FIG. 1 is a control block diagram of an apparatus for generating a driving sound library according to an exemplary embodiment. Referring to FIG. 1, the apparatus for generating driving sound library 100 according to an exemplary embodiment may include a database 110 configured to store a plurality of sound sources classified into a plurality of categories, an input 120 configured to receive scores for each theme for multiple driving sounds, a processor 130 configured to generate a plurality of driving sounds based on a sound source stored in the database 110 and an input through the input 120, and store the driving sounds in the driving sound library 140 by linking the plurality of driving sounds and themes.

The database 110 according to an exemplary embodiment may be configured to store a plurality of sound sources classified into a plurality of categories. In particular, the plurality of categories may refer to categories such as sounds of nature, sounds of animals, sounds of musical instruments, sounds of ASMR, and sound effects, but are not limited thereto.

Figure 3:
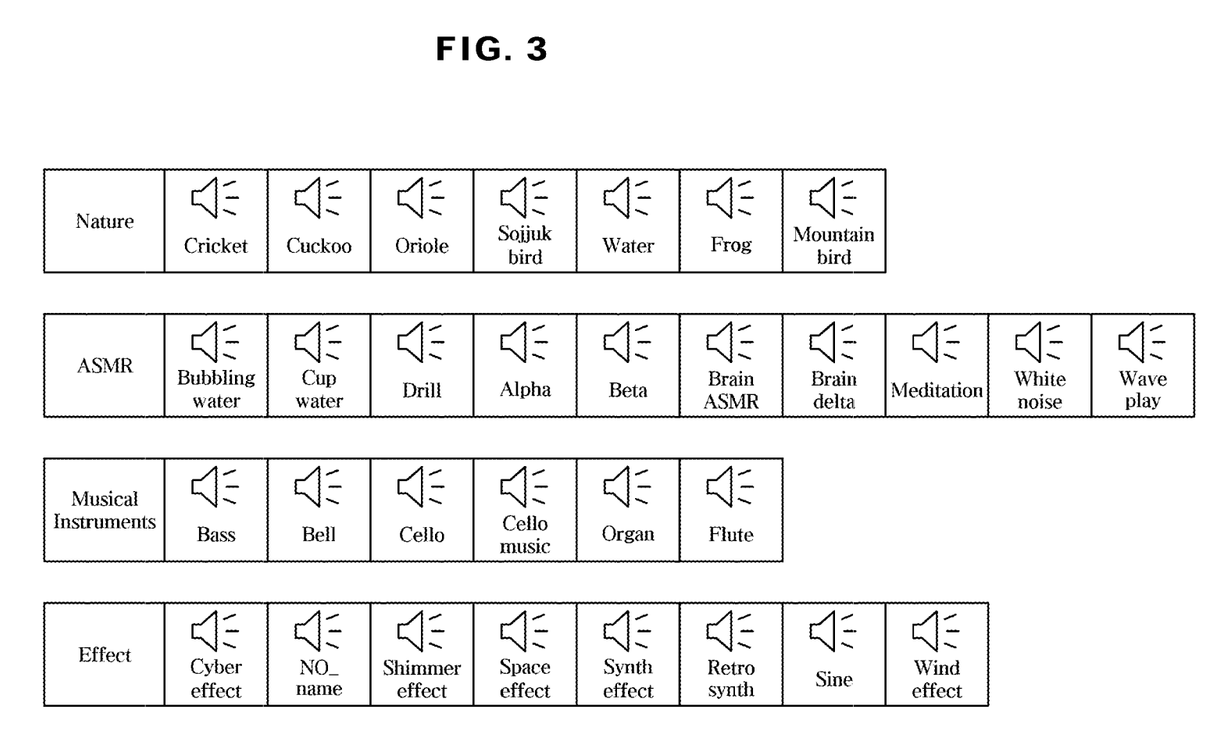
FIG. 3 is a diagram illustrating a plurality of sound sources stored in a database according to an exemplary embodiment.

FIG. 3 is a diagram illustrating a plurality of sound sources stored in a database according to an exemplary embodiment. Referring to FIG. 3, a plurality of sound sources may be classified in each of a plurality of categories. For example, a plurality of sound sources classified as musical instrument sounds may include sound sources such as Bass, Bell, and Cello. Accordingly, a plurality of sound sources may be collected and classified by an operator and stored in the database 110.

The database 110 configured to store a plurality of sound sources may be implemented by at least one of a nonvolatile memory devices such as cache, Read Only Memory (ROM), Programmable ROM (PROM), Erasable Programmable ROM (EPROM), Electrically Erasable Programmable ROM (EEPROM), and Flash memory to store various information, or a volatile memory device such as random access memory (RAM), or a storage medium such as a hard disk drive (HDD) or CD-ROM but is not limited thereto. The database 110 may be a memory implemented with a separate chip, or may be implemented with at least one processor 130 and a single chip.

The input 120 according to an exemplary embodiment may be configured to receive scores for each theme for a plurality of driving sounds from a user. Specifically, after listening to a specific driving sound, the user may input a score for each theme for the driving sound through input 120. In particular, the theme for the driving sound may be classified into a plurality of themes. For example, the theme of the driving sound may be classified into entertainment, business, relaxation, and travel.

For example, after listening to a specific driving sound, the user may receive a score for each theme, such as 'for entertainment: 8 points, for business: 2 points, for relaxation: 4 points, for travel: 6 points' for the heard driving sound through input 120. Therefore, the input 120 may include not only configurations such as keyboard, mouse, touch screen, knob, etc. that may directly input the score for each theme from the user, but also a communication module configured to receive the score for each theme input through an external terminal and indirectly receive the score for each theme.

The apparatus configured to generate driving sound library 100 according to an exemplary embodiment may include at least one memory (not shown) configured to store various programs such as a program for analyzing frequency and time characteristics of multiple sound sources, a program for modulating a plurality of sound sources by selecting a chord corresponding to a plurality of sound sources, a program that generates a number of driving sound sources based on a few sound sources using an artificial neural network model, and a program for classifying and storing a plurality of driving sounds.

The programs stored in the memory include Natural Language Processing (NLP) algorithm, K-means algorithm, Convolutional Neural Networks (CNN) algorithm, Generative Adversarial Networks (GAN) algorithm, and RNN (Recurrent). Neural Networks) algorithm, long short-term memory (LSTM) algorithm, which is a kind of RNN algorithm, and an artificial intelligence algorithm (artificial neural network model) such as Region Based Convolutional Neural Networks (R-CNN) algorithm. At least one processor 130 may execute various programs stored in the memory described above. Specifically, at least one processor 130 may be configured to generate a plurality of driving sounds by executing at least one program stored in the memory, and may store the plurality of driving sounds and the respective themes of the plurality of driving sounds in the driving sound library 140 in association with each other.

The driving sound library 140 may be implemented by at least one of a nonvolatile memory devices such as cache, Read Only Memory (ROM), Programmable ROM (PROM), Erasable Programmable ROM (EPROM), Electrically Erasable Programmable ROM (EEPROM), and Flash memory to store various information, or a volatile memory device such as random access memory (RAM), or a storage medium such as a hard disk drive (HDD) or CD-ROM but is not limited thereto. The driving sound library 140 may be a memory implemented as a separate chip, or may be implemented as a single chip with at least one processor 130 or database 110.

Figure 2:
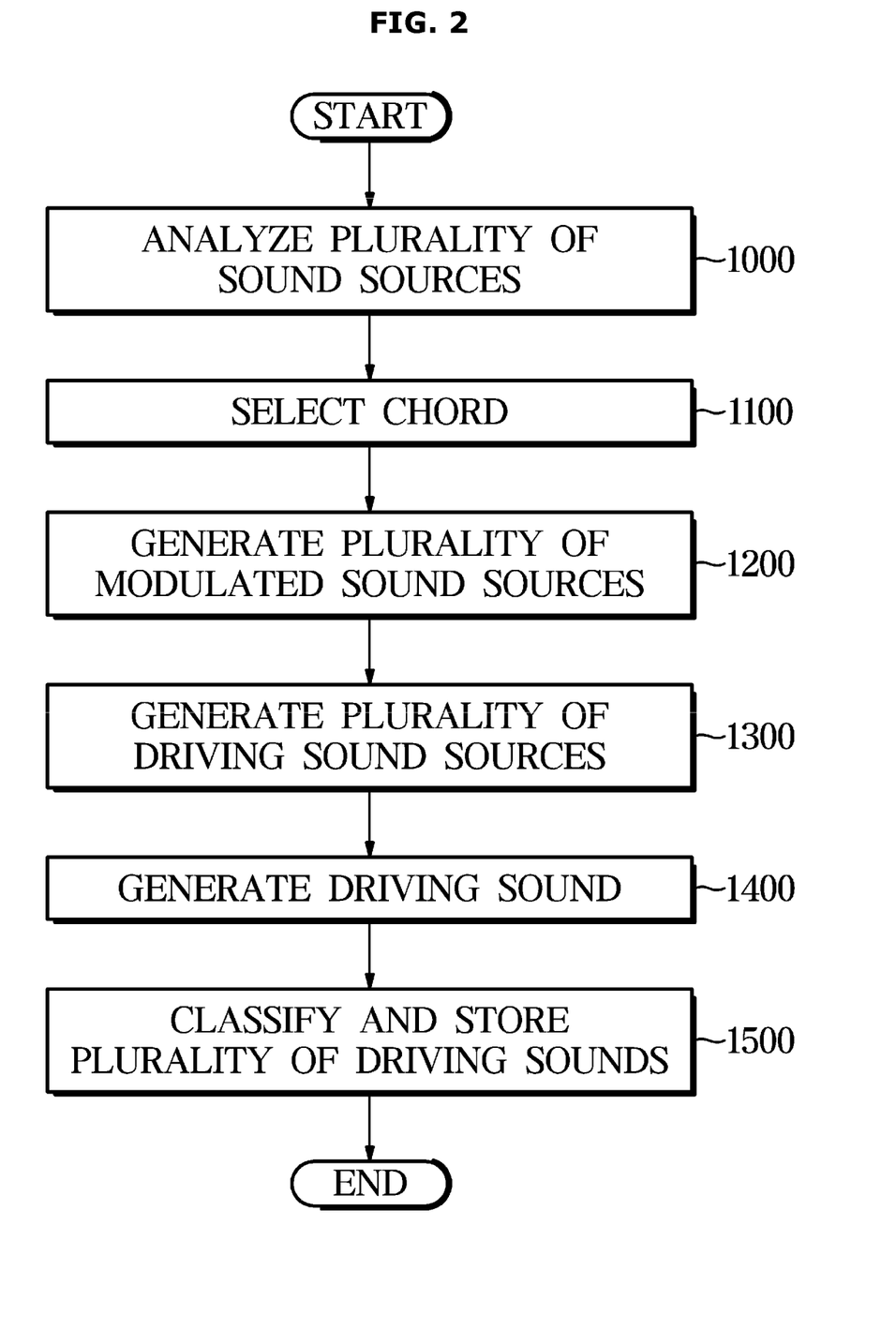
FIG. 2 is a control flowchart of an apparatus for generating a driving sound library according to an exemplary embodiment.
Figure 4:
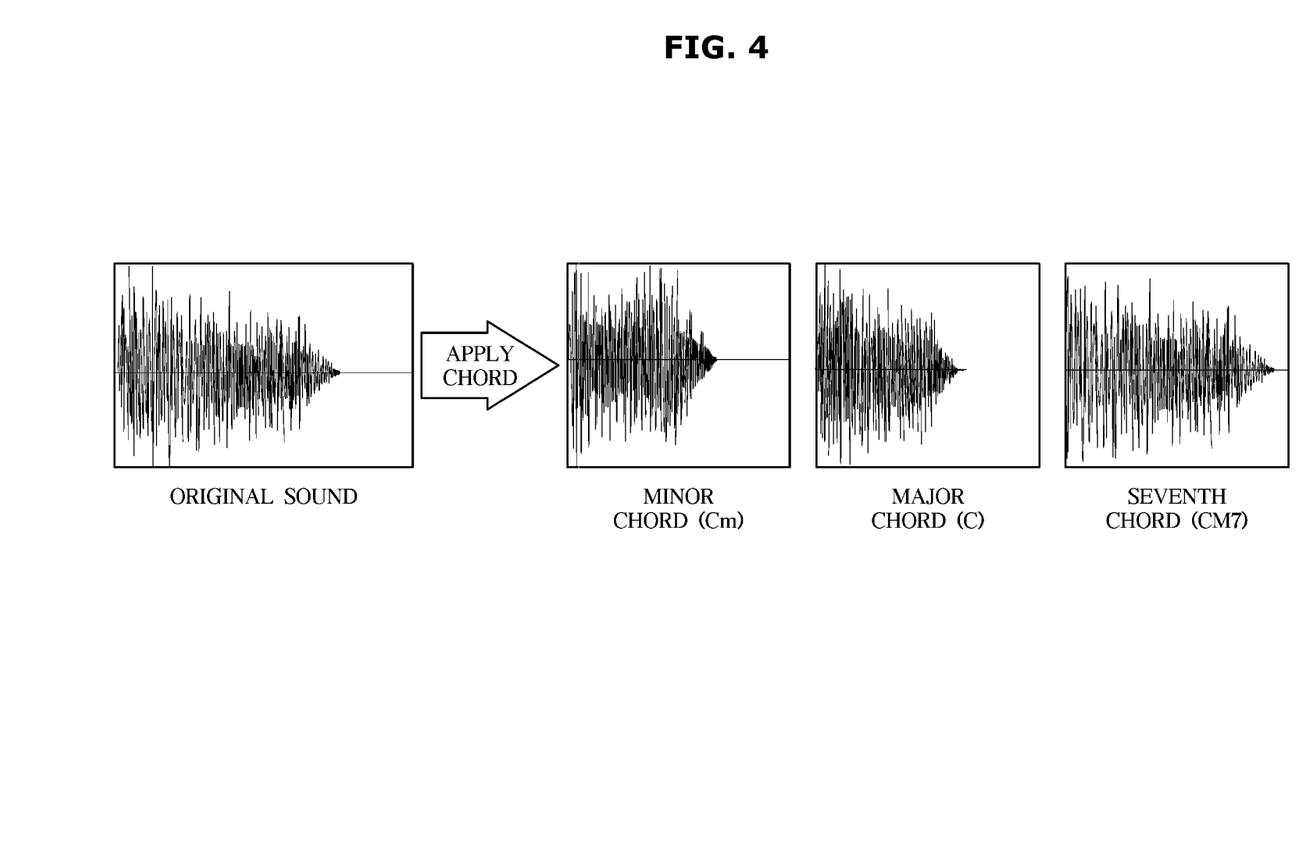
FIG. 4 illustrates a step of generating a plurality of modulated sound sources by applying a plurality of chords to sound sources.
Figure 5:
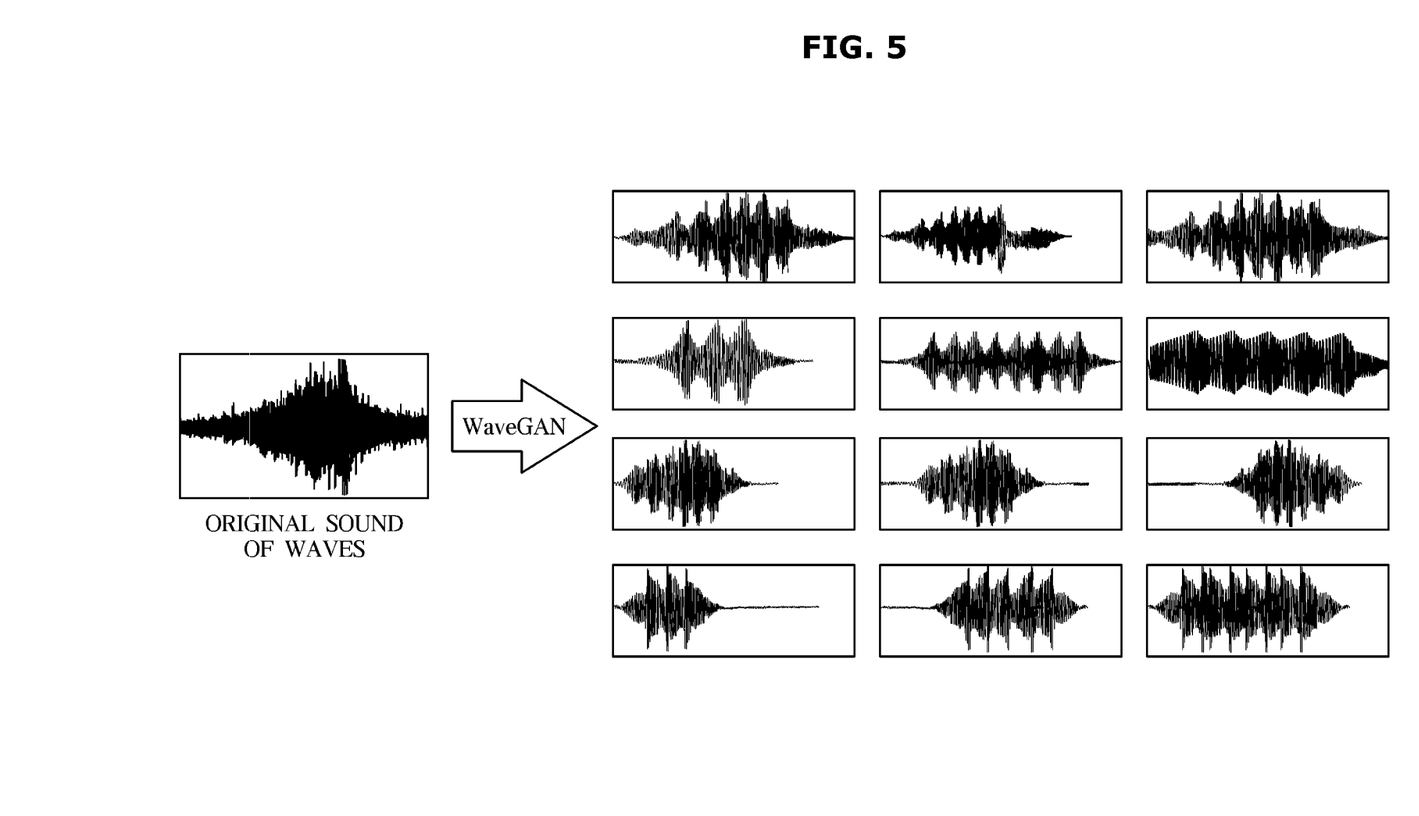
FIG. 5 illustrates a step of generating a plurality of driving sounds through an artificial neural network model according to an embodiment.

The configuration of the apparatus for generating driving sound library 100 according to an exemplary embodiment has been described above. Hereinafter, a method of generating the driving sound library 140 will be described in detail with reference to FIGS. 2 to 5. FIG. 2 is a control flowchart of an apparatus for generating a driving sound library according to an exemplary embodiment. FIG. 3 is a diagram illustrating a plurality of sound sources stored in a database according to an exemplary embodiment. FIG. 4 illustrates a step of generating a plurality of modulated sound sources by applying a plurality of chords to sound sources. FIG. 5 illustrates a step of generating a plurality of driving sounds through an artificial neural network model according to an exemplary embodiment.

Referring to FIG. 2, the at least one processor 130 may be configured to analyze frequency characteristics and temporal characteristics of each of a plurality of sound sources classified into a plurality of categories stored in the database 110 (1000). Specifically, at least one processor 130 may be configured to classify a plurality of sound sources according to frequency bands. For example, based on the frequency characteristics of the plurality of sound sources, the at least one processor 130 may be configured to select sound sources having a frequency band of 1 kHz or less as a first group, and sound sources having a frequency band of greater than 1 kHz and less than 5 kHz as a second group, and sound sources having a frequency band of more than 5 kHz and less than 10 kHz may be classified into a third group.

Additionally, at least one processor 130 may be configured to classify the plurality of sound sources into a plurality of groups based on temporal characteristics of the plurality of sound sources. For example, the at least one processor 130 may be configured to classify a sound source having a continuous sound as a first group, a sound source having a discontinuous sound as a second group, a sound source having a variable sound as a third group, and a sound source having a fixed sound as a fourth group based on the temporal characteristics of multiple sound sources. Thereafter, the at least one processor 130 may be configured to determine a chord corresponding to each of the plurality of sound sources according to the classification of the plurality of sound sources.

In other words, at least one processor 130 may be configured to determine a chord corresponding to each of the plurality of sound sources based on frequency characteristics and temporal characteristics of the plurality of sound sources (1100). Specifically, the at least one processor 130 may be configured to set the sound sources classified based on the frequency and time characteristics for analysis, and then analyze the sound sources according to the setting to select the most suitable chord. For example, the at least one processor 130 may be configured to set an analysis section and length, a window type, a sampling frequency, etc. for sound sources, and perform FFT analysis.

Thereafter, at least one processor 130 may be configured to determine a chord corresponding to each of the plurality of sound sources. For example, at least one processor 130 may be configured to apply a major seventh chord to a sound source having a frequency band of more than 1 kHz and less than 5 kHz and having a continuous sound. In other words, the at least one processor 130 may be configured to apply the same chord to sound sources classified by the same frequency band and having the same temporal characteristic.

Referring to FIG. 4, at least one processor 130 may be configured to generate three modulated sound sources by applying a minor chord (Cm), a major chord (C), and a seventh chord (CM7) to a sound source, respectively. In other words, at least one processor 130 may be configured to generate a plurality of modulated sound sources in which each of the plurality of sound sources is modulated by applying a chord corresponding to each of the plurality of sound sources (1200).

Thereafter, the at least one processor 130 may be configured to generate a plurality of driving sound sources using the generated modulated sound sources as input data of WaveGAN based on a plurality of sound sources stored in the database 110 and a plurality of sound sources (1300). In addition, at least one processor 130 may be configured to divide a plurality of sound sources for each time section and use them as input data of WaveGAN.

Specifically, the at least one processor 130 may be configured to use a sound source, a plurality of sound sources in which the sound source is divided for each time section, and modulated sound sources modulated by applying a chord to the sound source as input data of WaveGAN. For example, if 3 sound sources are divided into 10 time intervals and 4 chords are applied to them, the number of sound sources that may be used as input data of WaveGAN will be increased to 120 (3×10×4=120). In other words, the apparatus for generating driving sound library 100 according to an exemplary embodiment may be configured to generate a large number of driving sound sources through a small number of sound sources.

Referring to FIG. 5, when one sound source classified as a natural sound is used as input data of WaveGAN, many driving sound sources may be generated. Thereafter, at least one processor 130 may be configured to change pitches of the plurality of driving sound sources and generate a plurality of driving sounds (1400) based on the generated plurality of driving sound sources and a plurality of engine sound orders corresponding to the engine RPM in a preset range.

For example, the at least one processor 130 may be configured to modulate the sound source to increase the pitch by associating the plurality of driving sound sources generated through WaveGAN with the engine RPM of about 1000 to 6000 rpm. Specifically, the at least one processor 130 may be configured to generate a plurality of driving sounds by changing pitches of the plurality of driving sound sources so that the difference between the frequencies of the plurality of driving sound sources and the frequencies of the plurality of engine sound orders is less than or equal to a preset value.

For example, as the engine sound order increases, a plurality of driving sounds corresponding to each engine sound order may be generated by changing the pitch of the driving sound source so that the driving sound source has a high frequency band. Thereafter, the user may listen to the generated plurality of driving sounds and then input scores for each theme for the plurality of driving sounds through input 120. The input 120 may be configured to receive a theme-specific score for a plurality of driving sounds from a user, and transmit the theme-specific scores for a plurality of driving sounds to the at least one processor 130.

The at least one processor 130 may be configured to classify a plurality of driving sounds based on a theme-specific score for the plurality of driving sounds received from the input 120 and store the classified driving sounds in the driving sound library 140 (1500). Specifically, the input 120 may be configured to receive a score of a travel theme (hereinafter 'first theme') and a score of a business theme (hereinafter 'second theme') for each of the plurality of driving sounds, the at least one processor 130 may be configured to classify the driving sound having the highest score of the first theme among the plurality of driving sounds as a first theme, and classify a driving sound having the highest score of the second theme as a second theme and store it in the driving sound library 140.

For example, when the score of the first theme is 9 points and the score of the second theme is 7 points for a specific driving sound, the least one processor 130 may be configured to classify the specific driving sound as a first theme and store the sound in the driving sound library 140. In addition, when the score of the first theme is 5 points and the score of the second theme is 7 points for a specific driving sound, at least one processor 130 may be configured to classify the driving sound as a second theme and store the sound in the driving sound library 140.

As a result, the driving sound library 140 may be configured to store a plurality of driving sounds classified into a plurality of themes. According to the driving sound library 140 and apparatus for generating driving sound library 100 described above, even with a small number of sound sources, there is an advantage of providing various driving sounds by generating a plurality of driving sounds.

Figure 6:
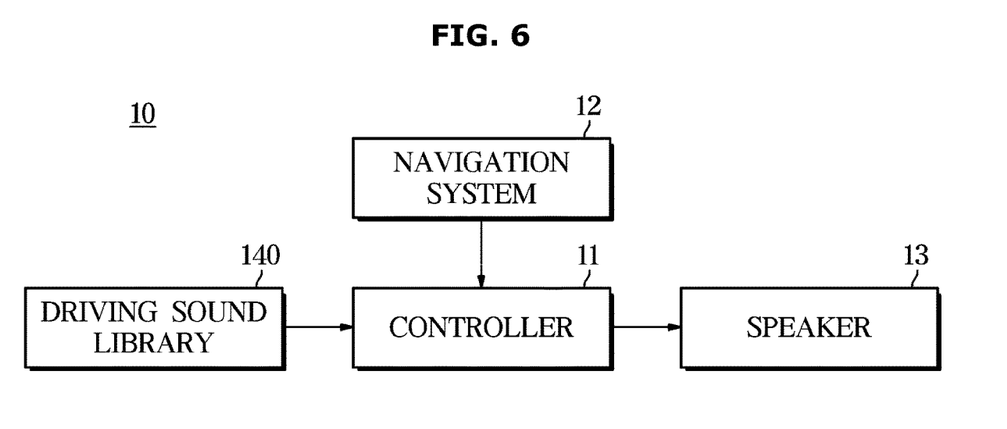
FIG. 6 is a control block diagram of a vehicle according to an exemplary embodiment.
Figure 7:
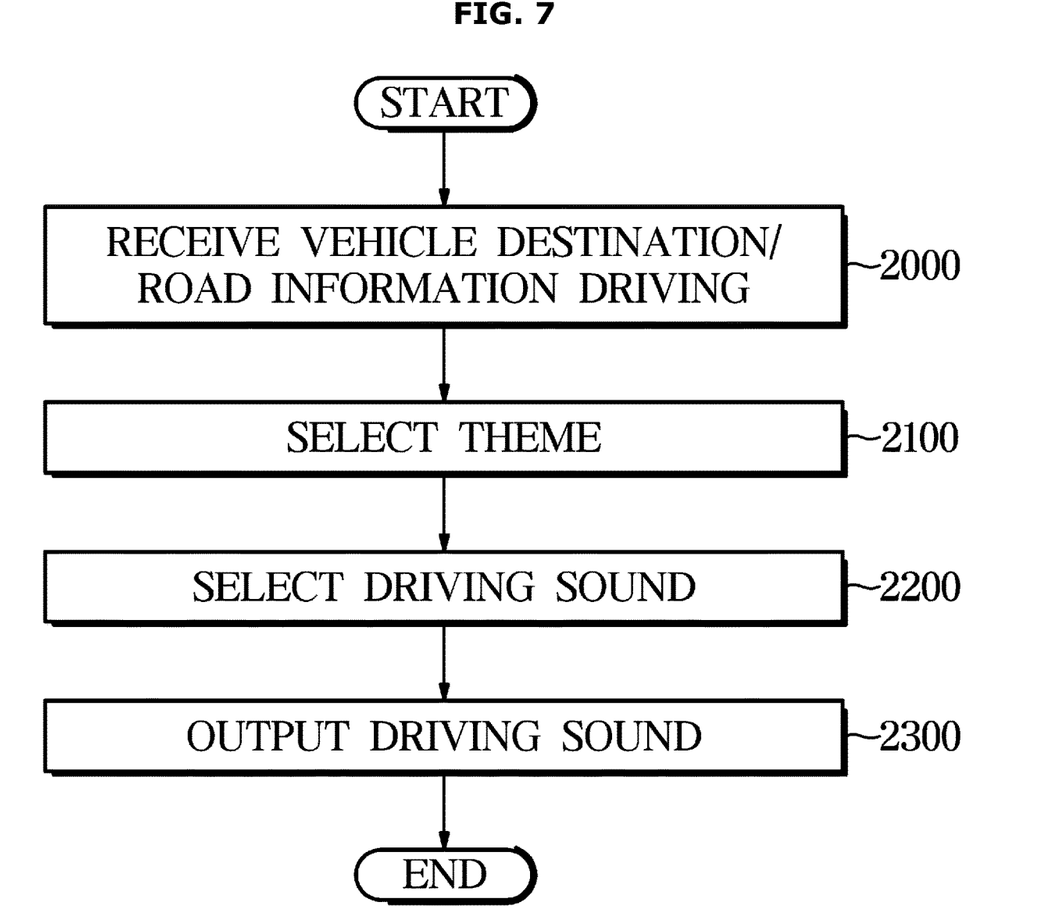
FIG. 7 is a flowchart illustrating a vehicle control according to an exemplary embodiment.

Hereinafter, a vehicle 10 including a driving sound library 140 according to an exemplary embodiment will be described with reference to FIGS. 6 to 7. FIG. 6 is a control block diagram of a vehicle according to an exemplary embodiment, and FIG. 7 is a control flowchart of a vehicle according to an exemplary embodiment. Referring to FIG. 6, vehicle 10 according to an exemplary embodiment may include a controller 11 configured to operate the speaker 13 to output the driving sound by selecting the driving sound from the driving sound library 140 and the driving sound library 140, a navigation system 12, and a speaker 13.

The driving sound library 140 may be generated through each step of FIG. 2. The navigation system 12 may be configured to generate driving route information based on the destination of the vehicle 10 input by the user. In addition, the navigation system 12 may provide road information on which the vehicle 10 is driving based on the current location of the vehicle 10. For example, the navigation system 12 may be configured to transmit information that the vehicle 10 is driving on a highway to the controller 11. The speaker 13 may be configured to output various sounds inside the vehicle 10. Speakers 13 for this may be provided on both doors of the vehicle 10, but any position in which the driver inside the vehicle 10 may hear the sound output may be provided without limitation.

Referring to FIG. 7, the controller 11 may be configured to receive the destination of the vehicle 10 input to the navigation system 12 from the navigation system 12 or information on the road on which the vehicle 10 is traveling (2000). After, the controller 11 may be configured to select any one theme from among the plurality of driving sound themes stored in the driving sound library 140 based on the destination of the vehicle 10 input to the navigation system 12 or the road information on which the vehicle 10 is traveling (2100), and may be configured to select a driving sound within the selected theme (2200) and operate the speaker 13 to output at least one selected driving sound (2300).

For example, when the destination of the vehicle 10 input to the navigation system 12 is an office, the controller 11 may be configured to determine the input as a "business theme" and select at least one driving sound from among a plurality of driving sounds stored in the driving sound library 140. In addition, when the road information on which the vehicle 10 is driving is a highway, the controller 11 may be configured to select at least one driving sound from among a plurality of driving sounds that are classified as "travel theme" and stored in the driving sound library 140.

In other words, the controller 11 may be configured to select a theme that is most suitable for the destination of the vehicle 10 input to the navigation system 12 or the most suitable theme for road information on which the vehicle 10 is driving. Accordingly, the controller 11 may include a memory in which a matching relationship between a destination and a theme and/or a matching relationship between road information and a theme is stored.

The controller 11 may be configured to receive various signals through in-vehicle communication network (CAN). In addition, the controller 11 may be configured to select at least one driving sound from among a plurality of driving sounds stored in association with a theme selected based on at least one of output torque, speed, and accelerator pedal pressure of the vehicle 10. For example, when the engine RPM corresponding to the output torque, speed, and accelerator pedal pressure of the vehicle 10 is determined to be about 2000 rpm, the controller 11 may be configured to select a driving sound source whose pitch is changed based on an engine sound order corresponding to about 2000 rpm among a plurality of driving sounds stored in association with the selected theme.

In addition, the controller 11 may be configured to determine the volume of the selected driving sound based on the output torque of the vehicle 10, a speed, and an accelerator pedal pressure. For example, as the output torque, speed, and accelerator pedal pressure of the vehicle 10 increase, the volume of the selected driving sound may be determined. Accordingly, the vehicle 10 according to an exemplary embodiment selects a theme based on destination information and a road environment, and outputs a driving sound classified by the selected theme, therefore may satisfy various needs of users.

In addition, the vehicle 10 according to an exemplary embodiment may be configured to select the driving sound that is modulated in advance based on the engine sound order and stored in the driving sound library 140, and therefore the vehicle 10 may rapidly reflect the change in the pitch of the driving sound according to the change in the output torque of the vehicle 10, the speed, and the pedal pressure of the accelerator pedal.

On the other hand, the disclosed exemplary embodiments may be implemented in a form of a recording medium for storing instructions executable by a computer. Instructions may be stored in a form of program code and, when executed by a processor, may be configured to generate a program module to perform the operations of the disclosed exemplary embodiments. The recording medium may be implemented as a non-transitory computer-readable recording medium.

The non-transitory computer-readable recording medium includes all types of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although exemplary embodiments of the present disclosure have been shown and described, it would be appreciated by those skilled in the art that changes may be made to these exemplary embodiments without departing from the principles and spirit of the present disclosure, the scope of which is defined in the claims and their equivalents.

According to the present disclosure, it may be possible to satisfy a user's request by outputting a driving sound classified into various themes to the user. Further, according to the present disclosure, it may be possible improve user satisfaction by outputting driving sounds of various themes based on a destination or a current location of a vehicle.

What is claimed is:

1. A non-transitory computer-readable medium storing a driving sound library generated by a method comprising:
analyzing, by a processor, frequency characteristics and temporal characteristics of each of a plurality of sound sources classified into a plurality of categories;

determining, by the processor, a chord corresponding to each of the plurality of sound sources based on the frequency characteristics and the time characteristics;

generating, by the processor, a plurality of modulated sound sources in which each of the plurality of sound sources is modulated by applying the chord corresponding to each of the plurality of sound sources;

generating, by the processor, a plurality of driving sound sources using the plurality of sound sources and the plurality of modulated sound sources as input data;

changing, by the processor, pitches of the plurality of driving sound sources based on the plurality of driving sound sources and a plurality of engine sound orders corresponding to an engine RPM of a preset range, and generating a plurality of driving sounds;

receiving, at the processor, scores for each theme among a plurality of themes for the plurality of driving sounds; and storing, by the processor, the plurality of driving sounds and themes of each of the plurality of driving sounds in association with each other.

2. The non-transitory computer-readable medium according to claim 1, wherein analyzing frequency characteristics and temporal characteristics of each of a plurality of sound sources classified into a plurality of categories includes:

classifying, by the processor, each of the plurality of sound sources according to frequency bands; and classifying, by the processor, each of the plurality of sound sources into a first sound source having a continuous sound and a second sound source having a discontinuous sound.

3. The non-transitory computer-readable medium according to claim 2, wherein generating a plurality of modulated sound sources in which each of the plurality of sound sources is modulated by applying a chord corresponding to each of the plurality of sound sources includes applying a same chord to sound sources classified in the same frequency band within the first sound source or the second sound source.

4. The non-transitory computer-readable medium according to claim 1, wherein generating a plurality of driving sound sources using the plurality of sound sources and the plurality of modulated sound sources as input data includes using sound sources obtained by dividing the plurality of sound sources for each time section as input data of WaveGan.

5. The non-transitory computer-readable medium according to claim 1, wherein changing pitches of the plurality of driving sound sources based on the plurality of driving sound sources and a plurality of engine sound orders corresponding to an engine RPM of a preset range, and generating a plurality of driving sounds includes changing the pitches of the plurality of driving sound sources such that a difference value between the frequencies of the plurality of driving sound sources and the frequencies of the plurality of engine sound orders is equal to or less than a preset value.

6. The non-transitory computer-readable medium according to claim 1, wherein receiving scores for each theme for the plurality of driving sounds includes receiving a score of a first theme and a score of a second theme for each of the plurality of driving sounds, and wherein storing the plurality of driving sounds and themes of each of the plurality of driving sounds in association with each other includes storing by classifying the driving sound having the highest score of the first theme among the plurality of driving sounds as a first theme, and classifying the driving sound having the highest score of the second theme as a second theme.

7. A vehicle, comprising:
a driving sound library according to claim 1;
a speaker, and
a controller configured to select any one theme from among the plurality of themes of driving sounds stored in the driving sound library based on the destination of the vehicle inputted in the navigation system or the road information on which the vehicle is driving, and operate the speaker to output a plurality of stored driving sounds in association with the selected theme.

8. The vehicle according to claim 7, wherein the controller is configured to select at least one driving sound among plurality of driving sounds stored in association with the selected theme based on at least one of an output torque, a speed, an acceleration pedal pressure of the vehicle.

9. The vehicle according to claim 7, wherein the controller is configured to determine volume of at least a plurality of driving sounds stored in association with the selected theme based on at least one of the output torque, speed, and accelerator pedal pressure of the vehicle.

10. An apparatus for generating driving sound source library, comprising:

a database configured to store a plurality of sound sources classified as plurality of categories;

at least one processors configured to:
analyze frequency characteristics and temporal characteristics of each of a plurality of sound sources;

determine a chord corresponding to each of the plurality of sound sources based on the frequency characteristics and the time characteristics;

generate a plurality of modulated sound sources in which each of the plurality of sound sources is modulated by applying the chord corresponding to each of the plurality of sound sources;

generate a plurality of driving sound sources using the plurality of sound sources and the plurality of modulated sound sources as input data; and change pitches of the plurality of driving sound sources based on the plurality of driving sound sources and a plurality of engine sound orders corresponding to an engine RPM of a preset range, and generate a plurality of driving sounds;

an input configured to receive scores for each theme among a plurality of themes for the plurality of driving sounds; and a driving sound library in which the driving sounds are stored;

wherein the at least one processor is configured to store the plurality of driving sounds and themes of each of the plurality of driving sounds in association with each other in the driving sound library.

11. The apparatus according to claim 10, wherein the at least one processor is configured to classify each of the plurality of sound sources according to frequency bands; and classify each of the plurality of sound sources into a first sound source having a continuous sound and a second sound source having a discontinuous sound.

12. The apparatus according to claim 11, wherein the at least one processor is configured to apply a same chord to sound sources classified in the same frequency band within the first sound source or the second sound source.

13. The apparatus according to claim 10, wherein the at least one processor is configured to use sound sources obtained by dividing the plurality of sound sources for each time section as input data of WaveGan.

14. The apparatus according to claim 10, wherein the at least one processor is configured to change the pitches of the plurality of driving sound sources such that a difference value between the frequencies of the plurality of driving sound sources and the frequencies of the plurality of engine sound orders is equal to or less than a preset value.

15. The apparatus according to claim 10, wherein the input is configured to receive scores for each theme for the plurality of driving sounds includes receiving a score of a first theme and a score of a second theme for each of the plurality of driving sounds, and wherein the at least one processor is configured to store by classifying the driving sound having the highest score of the first theme among the plurality of driving sounds as a first theme, and classifying the driving sound having the highest score of the second theme as a second theme.

* * * * *